US007725125B2

(12) United States Patent
Fu et al.

(10) Patent No.: US 7,725,125 B2
(45) Date of Patent: *May 25, 2010

(54) AUDIO MANAGEMENT IN A DUAL PROCESSOR ENVIRONMENT

(75) Inventors: Runbo Fu, Ontario (CA); Padakandla Krishna Rao, Ontario (CA); Hongchang Tian, Ontario (CA)

(73) Assignee: Research In Motion Limited, Waterloo (CA)

( * ) Notice: Subject to any disclaimer, the term of this patent is extended or adjusted under 35 U.S.C. 154(b) by 1086 days.

This patent is subject to a terminal disclaimer.

(21) Appl. No.: 11/249,408

(22) Filed: Oct. 14, 2005

(65) Prior Publication Data

US 2007/0087779 A1     Apr. 19, 2007

(51) Int. Cl.
*H04M 1/00* (2006.01)
(52) U.S. Cl. ............... 455/552.1; 455/556.1; 455/569.1
(58) Field of Classification Search .............. 455/552.1, 455/556.1, 569.1
See application file for complete search history.

(56) References Cited

U.S. PATENT DOCUMENTS

| 5,966,667 | A | 10/1999 | Halloran et al. | |
|---|---|---|---|---|
| 2003/0013477 | A1 | 1/2003 | McAlinden | |
| 2003/0063736 | A1* | 4/2003 | King | 379/406.01 |
| 2003/0188127 | A1* | 10/2003 | So | 712/34 |
| 2003/0224768 | A1* | 12/2003 | Adjamah | 455/418 |
| 2004/0203976 | A1 | 10/2004 | Gupta et al. | |
| 2004/0236927 | A1 | 11/2004 | Irie et al. | |
| 2005/0136992 | A1* | 6/2005 | Mueller | 455/574 |
| 2007/0140199 | A1* | 6/2007 | Zhao et al. | 370/338 |

FOREIGN PATENT DOCUMENTS

EP          1318501          6/2003

OTHER PUBLICATIONS

Kenneth Boyce, "Cellular Handset Audio Evolution—pt3", Audio Designline, Aug. 29, 2005, XP002370800, pp. 1, 3-6; figure 3.
Wavearts, "Mobilesynth, Ringtone and Game Audio for the Mobies Devices" Product Information, Oct. 14, 2004, XP002370801, the whole document.
Intel, "User's Guide, Communication Processor and Audio Concept", Intel PXA27X Processor Reference Platform, Sep. 2004, pp. 43-57. XP002370802, the whole document.
Examiner's Requisition for Canadian Patent Application No. 2,563,481 dated Oct. 6, 2009.
EP Application No. EP 08162933, European Search Report dated Nov. 13, 2008.

* cited by examiner

*Primary Examiner*—Nay A Maung
*Assistant Examiner*—Tuan H Nguyen
(74) *Attorney, Agent, or Firm*—Moffat & Co.

(57) ABSTRACT

In a dual processor mobile device one processor is a radio processor and one processor is an application processor, the mobile device further including a polyphonic audio chip, a method and apparatus for audio control, the method having the steps of: connecting the polyphonic audio chip between the controller and a highly integrated audio codec; connecting the radio processor to the highly integrated audio codec; controlling the highly integrated audio codec from the radio processor; and coordinating between the application processor and the radio processor to allow the radio processor to control the highly integrated audio codec through the radio processor.

16 Claims, 5 Drawing Sheets

# AUDIO MANAGEMENT IN A DUAL PROCESSOR ENVIRONMENT

FIELD OF THE APPLICATION

The present application relates to audio functionality in a dual processor wireless device, and more specifically to a method and apparatus for controlling audio output on a dual processor wireless device.

BACKGROUND

Mobile or wireless devices are increasingly becoming used for a variety of tasks. These tasks may require different hardware and configurations in order to run more efficiently, and in some cases the different hardware is comprised of various processors having specialized tasks. For example, one processor may be used to run user applications, while a second may be used for control of the radio and voice path on the mobile device.

In multi-processor environments where the audio path may be generated from either of an application processor (controller processor) or a radio processor, a complex series of tasks need to occur in order to produce the audio output at one of a plurality of audio outputs. This is further complicated if additional hardware such as an audio chip, referred to herein as a Melody chip, is added. With the above dual processor configuration, the Melody chip is controlled by the application processor.

The audio source with the above configuration can be either the Melody chip or a voice codec. In this case, the analog output from the Melody chip needs to be amplified before being sent through a multiplexer to choose between the Melody chip and the voice codec chip output. Once multiplexed, the audio can go to the output, such as a speaker, headset, handset, Bluetooth™ or any other such audio output. This requires considerable hardware and coordination in the output of the audio.

BRIEF DESCRIPTION OF THE DRAWINGS

The present application will be better understood with reference to the drawings in which.

DETAILED DESCRIPTION OF THE DRAWINGS

The present method and apparatus overcome the deficiencies of the prior art by providing for a highly integrated audio codec within the dual processor environment. Control of the highly integrated audio codec (HIAC) is accomplished through the radio processor. Further, user applications can take control of the audio output through control signals between the application processor and the radio processor. The ordering of these control signals is important in order to ensure unwanted noise is avoided.

The use of a HIAC integrated circuit provides flexibility and savings by ensuring that amplifier circuits, as well as audio path control circuits, can be used for input from both a Melody chip and from a radio processor.

The present application therefore provides, in a dual processor mobile device one processor is a radio processor and one processor is an application processor, the mobile device further including a polyphonic audio chip, a method of audio control comprising the steps of: connecting the polyphonic audio chip between the controller and a highly integrated audio codec; connecting the radio processor to the highly integrated audio codec; controlling the highly integrated audio codec from the radio processor; and coordinating between the application processor and the radio processor to allow the application processor to control the highly integrated audio codec through the radio processor.

The present application further provides a mobile device having improved audio management, the mobile device comprising: a radio subsystem adapted to communicate with a network; a radio processor having a digital signal processor and adapted to interact with said radio subsystem: an application processor adapted to run user applications, the application processor further adapted to interact with memory, a display and keyboard; a highly integrated audio codec adapted to interact with audio output means and further adapted to interact with said radio processor; a polyphonic audio chip connected between said application processor and said highly integrated audio codec; and communication means between the application processor and radio processor, said communication means adapted to allow said application processor access to said highly integrated audio codec through said radio processor.

Figure 1:
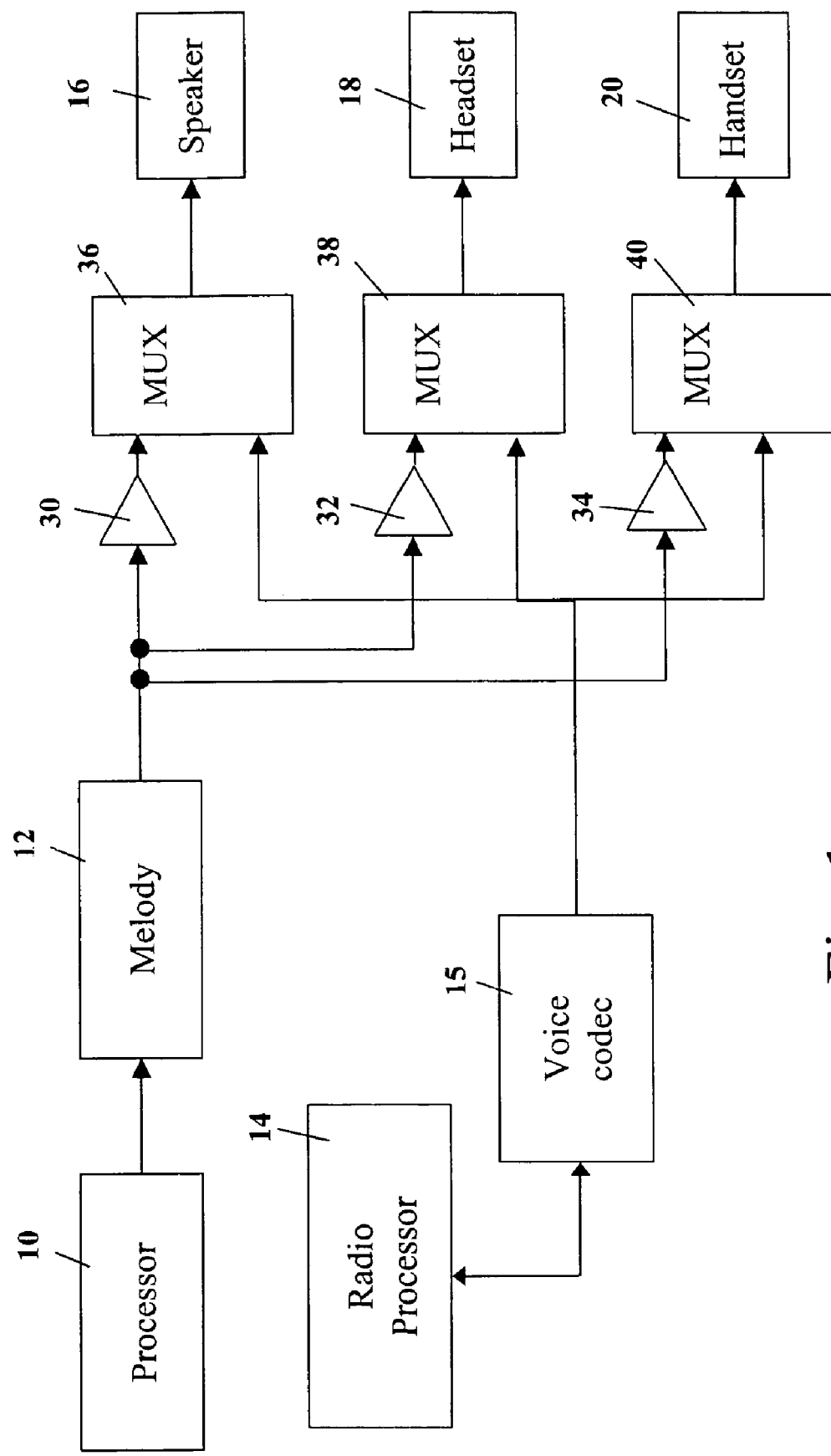
FIG. 1 is a block diagram of an audio path showing the problems associated with having two audio or input sources being propagated to a multitude of audio output sources.

Reference is now made to FIG. 1. Mobile devices include a variety of chips in order to accommodate the various functionalities required of the mobile device. In data devices it is sometimes preferable to include dual processors, where a first processor is used for digital signal processing and interfacing with the radio circuitry on the mobile device. The second processor is preferably an application processor that is used to run various user applications.

In one embodiment, other chips can also be added for specialized purposes. For example, a polyphonic audio chip, referred to in the art as a Melody chip, can be used to play a musical instrument digital interface (MIDI) format file, WAV files, certain voice files, MP3 files, advanced audio coding (AAC) files or other types of audio files known to those skilled in the art.

Referring to FIG. 1, an application processor 10 controls the Melody chip 12. This is a preferred embodiment since many of the applications that require the processing of the Melody chip would be run on application processor 10.

A second processor, referred to herein as a radio processor 14, is used to control the voice path and the radio. Radio processor 14 preferably includes a DSP and interacts with a voice codec 15 as illustrated in FIG. 1.

As will be appreciated by those skilled in the art, a voice call will be generally processed by radio processor 14 and the audio output from this call will proceed to various output sources such as a speaker 16, a headset 18 or a handset speaker 20.

The problem with the above is that the analog output from Melody chip 12 needs to also go to speaker 16, headset 18 or handset 20. In order to accomplish this, the solution of FIG. 1 shows that the Melody output is first sent through an amplifier 30, 32 or 34 and into a multiplexer 36, 38 or 40. At the multiplexer 36, 38 or 40 the signal is multiplexed with the signal from radio processor 14 to determine which signal should be output to speaker 16, headset 18 or handset 20.

The solution of FIG. 1 thus requires three separate audio amplifiers and three multiplexers to be able to multiplex with the voice codec. This thus is a costly solution and does hot allow easy expansion of the circuit for additional audio inputs or outputs.

Figure 2:
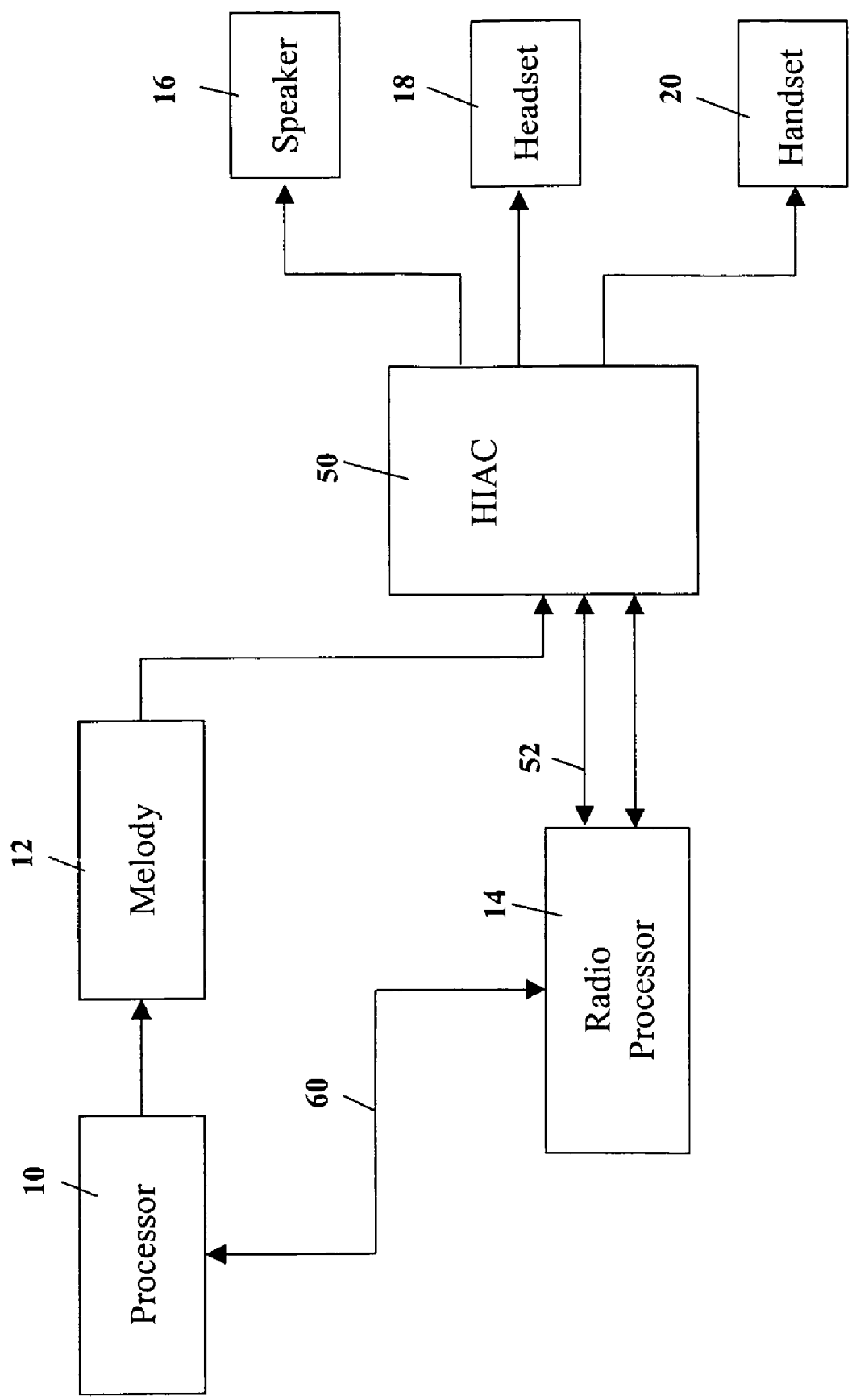
FIG. 2 shows a block diagram of a preferred embodiment of the present apparatus.

Reference is now made to FIG. 2. FIG. 2 shows a preferred embodiment of the present apparatus. In FIG. 2, application processor 10 interacts with Melody chip 12 to produce an analog output that is sent to a highly integrated audio codec 50 (HIAC 50). HIAC 50 provides a variety of functionality including a voice codec, as well as a multiplexer and amplifier all built in to the same chip.

Radio processor 14 further provides a digital input to HIAC 50.

As will be appreciated by those skilled in the art, in order to ensure that control of the audio path is maintained and that noise is reduced or eliminated, synchronization needs to occur between application processor 10 and radio processor 14.

In the preferred embodiment of FIG. 2, radio processor 14 includes a control line 52 for controlling the Serial Peripheral Interface™ (SPI) of HIAC 50. This can be used to send HIAC 50 instructions such as which line to use as the audio input, which line to use as the audio output, volume control instructions, as well as other instructions known in the art.

As would be appreciated, an alternative embodiment allows application processor 10 to have primary control of HIAC 50 and the present application is not meant to be limited to one chip having control of HIAC 50 over the other.

For application processor 10 to give control to an audio output such as speaker 16, headset 18 or handset 20 to a Melody chip 12, synchronization needs to occur between application processor 10 and radio processor 14. This is accomplished through a communications link 60.

In a preferred embodiment, communications link 60 acts as a modem. AT commands can be sent between the application processor 10 and the radio processor 14. Those skilled in the art will realize that AT commands are not the only form of communication that could be used, but rather any form of interprocessor communication could be utilized, and AT commands are used as an example only herein. These commands can indicate to the radio processor that the application processor wishes to take control of the HIAC 50 to send audio out, control volume, select the audio output hardware, or that the application processor is done with HIAC 50.

In an exemplary situation, a user wishes to perform a function that requires Melody chip 12 to output a sound to speaker 16. In order for this to be accomplished, application processor 10 sends an AT command to radio processor 14 first switching the output path to speaker 16.

Once the application processor 10 receives an acknowledgement that the output path has been switched to speaker 16, application processor 10 next switches the audio input for the HIAC 50 to be from Melody 12. This can be done by identifying an external input source on HIAC 50 to be the location that HIAC 50 should receive its audio stream from.

Once radio processor 14 receives the command to switch the audio path, it then sends the appropriate command to the HIAC 50 to use the audio stream from Melody chip 12.

The above can be summarized by the processor sending following:

| | |
|---|---|
| AT + AUDIOOUTPUT | This switches the output path to a perimeter specified in this command. |
| AT + MULTIMEDIA = 1, "EXT:O" | This changes the source at HIAC 50 to be external port 0 and tells HIAC 50 to play what's at external source 0. |

Once Melody chip 12 is finished playing whatever audio is required by application processor 10, then application processor 10 can tell radio processor 14 to stop playing. This can be sent with a command such as AT+MULTIMEDIA=0, where this command tells the HIAC 50 to stop playing.

As will be appreciated by those skilled in the art, in some cases the audio that is currently playing may need to be interrupted by other audio. For example, if a telephone call is received while audio is being played by Melody chip 12, the audio source from Melody chip 12 may need to stop. In this case, a stop command can be sent from application processor 10 to radio processor 14 before the new audio source is specified and a start command is issued.

The above sequence is also important. If the path is not switched before a source is specified then the audio output may create a noise such as a "pop". This undesirable and therefore should be avoided. Thus it is important to first of all switch the audio path and then to switch the source.

Other commands that may be important between application processor 10 and radio processor 14 include a volume control. As will be appreciated by those skilled in the art, volume can be controlled at either Melody chip 12 or at the HIAC 50. If it is controlled at HIAC 50 then a command from application processor 10 such as AT+VOLUME can be sent to radio processor 14, which can then use control line 52 in order to control the volume output from HIAC 50.

Output from radio processor 14 is digital and if this source is to be used, HIAC 50 can be set appropriately using a control line 52.

Exemplary commands to the radio processor 14 from an application processor 10 could therefore be:
1. Pre-Melody audio output switching
AT+AUDIOOUTPUT=x
(x=2—Speaker, 3—Headset, 4—Handset and 5—BlueTooth Headset)
2. Pre-Melody audio volume setting
AT+VOLUME=x,y
(x is the same def. as the above in step 1 and y is between 0 to 7)
3. Pre-Melody audio source switching to melody and change gain settings
AT+AUDIOOUTPUT=2 (if not set the above)
AT+MULTIMEDIAGAIN=0,0,10,13,13,0,0
   0—Table # and currently use 0
   0—ain unused in Warbler
   10—Speaker gain
   13—Headset gain
   13—Handset gain
   0—BlueTooth Headset gain
   0—Bluetooth™ Carkit gain
4. Send AT request to patriot to play melody AT+MULTIMEDIA=1, "EXT:0"
5. Send AT request to patriot to switch audio source to patriot AT+MULTIMEDIA=0

6. Post-Melody audio input switching and volume setting
AT+AUDIOOUTPUT=x (the same as before melody playing)
AT+VOLUME=x,y The above is not meant to be limiting. Various numbers of audio outputs could be available. Three audio outputs are illustrated merely for convenience and various other audio outputs may be possible.

Figure 3:
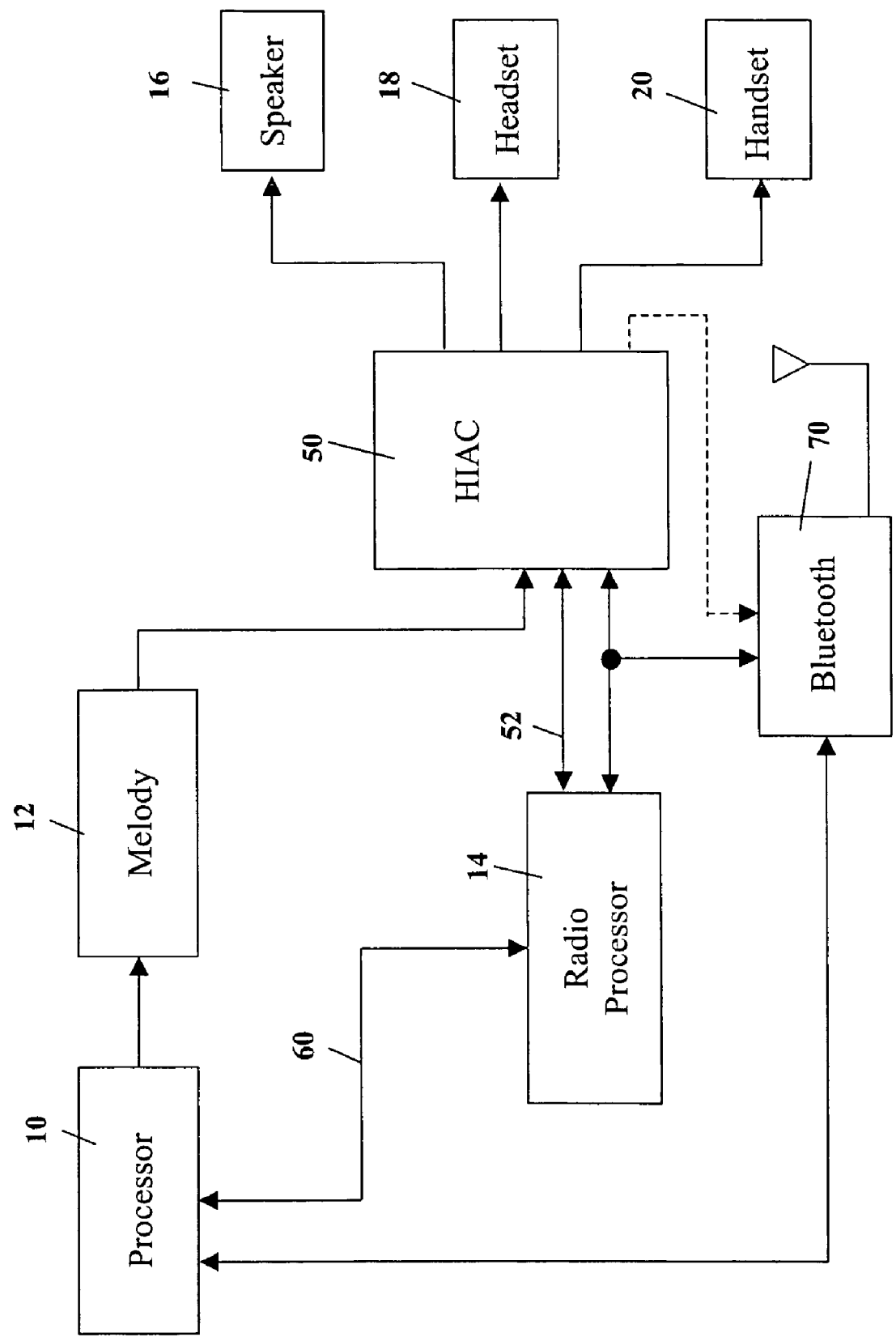
FIG. 3 shows an alternative embodiment in which a Bluetooth™ chip is added to the embodiment of FIG. 2.

Reference is now made to FIG. 3. If the user wishes to also use a Bluetooth™ chip in order to provide a further audio output, this can be accomplished by adding a Bluetooth™ chip 70 as seen in FIG. 3. The remaining components of FIG. 3 are identical to those of FIG. 2 and similar numbering is used.

Bluetooth™ chip 70 can receiving audio input from either radio processor 14 or as a separate audio output from HIAC 50.

The above therefore provides for a single HIAC 50 to replace multiple amplifiers and multiplexers. HIAC 50 further provides for multiple audio paths. The above also provides for the synchronization between a multiprocessor environment in which one processor is an application processor and therefore controls user applications, and the other is a radio processor in which voice audio can be processed and output from.

Figure 4:
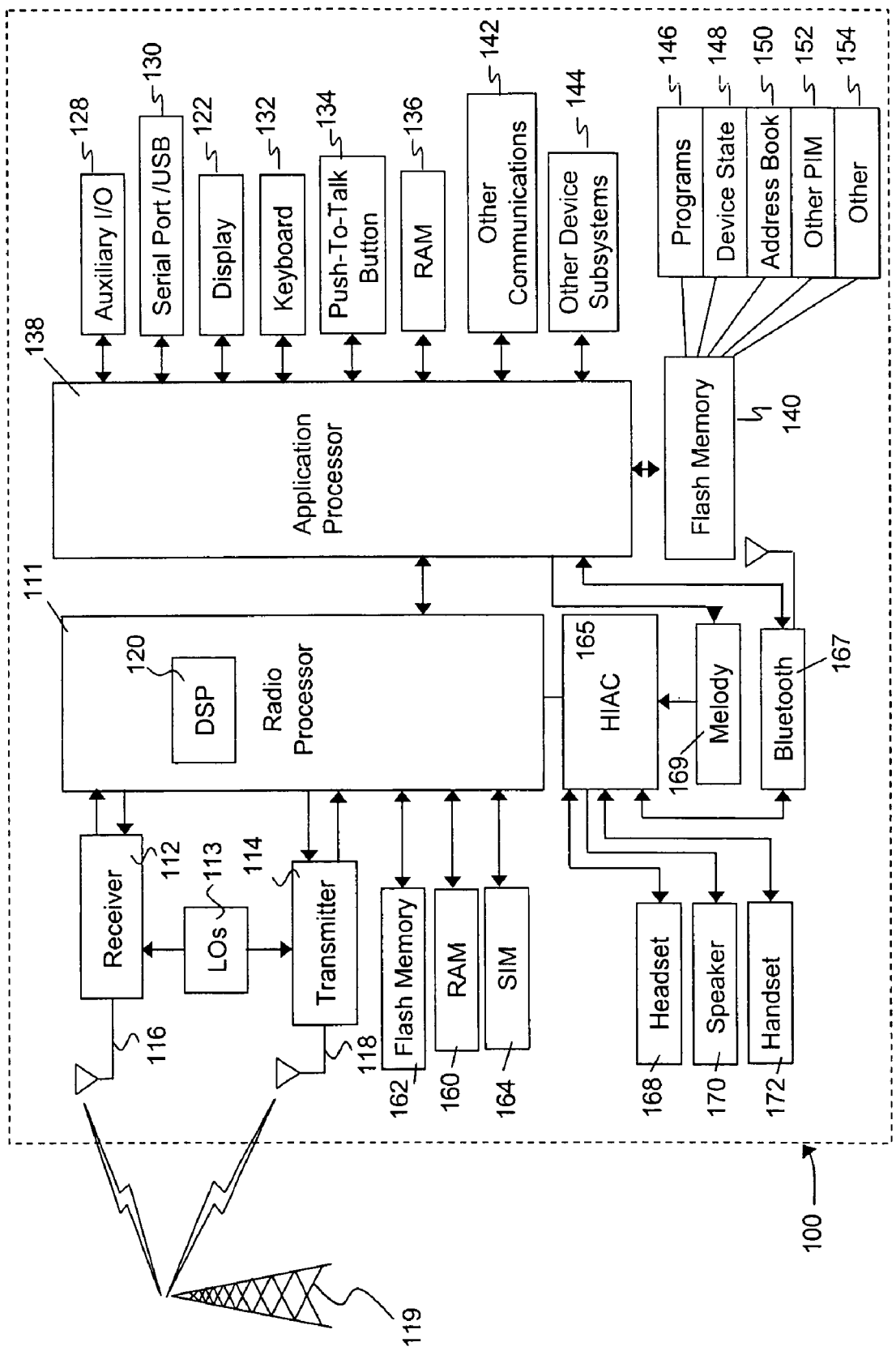
FIG. 4 shows a block diagram of an exemplary mobile device incorporating the present method and apparatus.

Reference is now made to FIG. 4. FIG. 4 is a block diagram illustrating a mobile station including preferred embodiments of the apparatus and method of the current application. Mobile station 100 is preferably a two-way wireless communication device.

Mobile station 100 incorporates a communication subsystem having both a receiver 112 and a transmitter 114, as well as associated components such as one or more, preferably embedded or internal, antenna elements 116 and 118, local oscillators (LOs) 113, and a processing module such as a digital signal processor (DSP) 120.

As will be apparent to those skilled in the field of communications, the particular design of the communication subsystem will be dependent upon the communication network in which the device is intended to operate.

When required network registration or activation procedures have been completed, mobile station 100 may send and receive communication signals over the network 119. Signals received by antenna 116 through communication network 119 are input to receiver 112, which may perform such common receiver functions as signal amplification, frequency down conversion, filtering, channel selection and the like, and in the example system shown in FIG. 4, analog to digital (A/D) conversion. A/D conversion of a received signal allows more complex communication functions such as demodulation and decoding to be performed in the DSP 120.

In a similar manner, signals to be transmitted are processed, including modulation and encoding for example, by DSP 120 and input to transmitter 114 for digital to analog conversion, frequency up conversion, filtering, amplification and transmission over the communication network 119 via antenna 118. DSP 120 not only processes communication signals, but also provides for receiver and transmitter control. For example, the gains applied to communication signals in receiver 112 and transmitter 114 may be adaptively controlled through automatic gain control algorithms implemented in DSP 120.

Mobile station 100 preferably includes a radio processor 111 and a microprocessor 138, which together control the overall operation of the device. DSP 120 is located on radio processor 111. Communication functions are performed through radio processor 111.

Radio processor 111 interacts with receiver 112 and transmitter 114, and further with flash memory 162, random access memory. (RAM) 160, the subscriber identity module 164, and a highly integrated audio codec 165 (HIAC 165).

A headset 168, a speaker 170, and a handset 172 and a Bluetooth™ chip 167 all interact through the HIAC 165

Application processor 138 interacts with further device subsystems such as the display 122, flash memory 140, random access memory (RAM) 136, auxiliary input/output (I/O) subsystems 128, serial port or USB 130, keyboard 132, push to talk button 134, other communications 142 and other device subsystems generally designated as 144.

Some of the subsystems shown in FIG. 4 perform communication-related functions, whereas other subsystems may provide "resident" or on-device functions. Notably, some subsystems, such as keyboard 132 and display 122, for example, may be used for both communication-related functions, such as entering a text message for transmission over a communication network, and device-resident functions such as a calculator or task list.

Software used by radio processor 111 and application processor 138 is preferably stored in a persistent store such as flash memory 140 and 162, which may instead be a read-only memory (ROM) or similar storage element (not shown). Those skilled in the art will appreciate that the operating system, specific device applications, or parts thereof, may be temporarily loaded into a volatile memory such as RAM 136 and RAM 160. Received communication signals may also be stored in RAM 136.

As shown, flash memory 140 can be segregated into different areas for computer programs 146, device state 148, address book 150, other personal information management (PIM) 152 and other functionality generally designated as 154. These different storage types indicate that each program can allocate a portion of flash memory 140 for their own data storage requirements. Application processor 138, in addition to its operating system functions, preferably enables execution of software applications on the mobile station.

For voice communications, overall operation of mobile station 100 is similar, except that received signals would preferably be output to a speaker 170 or headset 168 and signals for transmission would be generated by a microphone 172. Alternative voice or audio I/O subsystems, such as a voice message recording subsystem, may also be implemented on mobile station 100. Further speaker 170 could be either a loud speaker for use with, for example, hands free operation or conference calling, or could be the handset speaker that a user could put to his or her ear.

Serial port or USB 130 in FIG. 4 would normally be implemented in a personal digital assistant (PDA)-type mobile station for which synchronization with a user's desktop computer (not shown) may be desirable, but is an optional device component. Such a port or USB 130 would enable a user to set preferences through an external device or software application and would extend the capabilities of mobile station 100 by providing for information or software downloads to mobile station 100 other than through a wireless communication network. The alternate download path may for example be used to load an encryption key onto the device through a direct and thus reliable and trusted connection to thereby enable secure device communication.

Other communications subsystems 144, such as a short-range communications subsystem, is a further optional component which may provide for communication between mobile station 100 and different systems or devices, which need not necessarily be similar devices. For example, the subsystem 144 may include an infrared device and associated circuits and components or a Bluetooth™ communication module to provide for communication with similarly enabled systems and devices.

Alternatively, the Bluetooth™ communication module could be module 167 communicating with HIAC 165 and receiving control from control application processor 138.

A Melody Chip 169 interacts with HIAC 165 and further is controlled by application processor 138 as described above.

Figure 5:
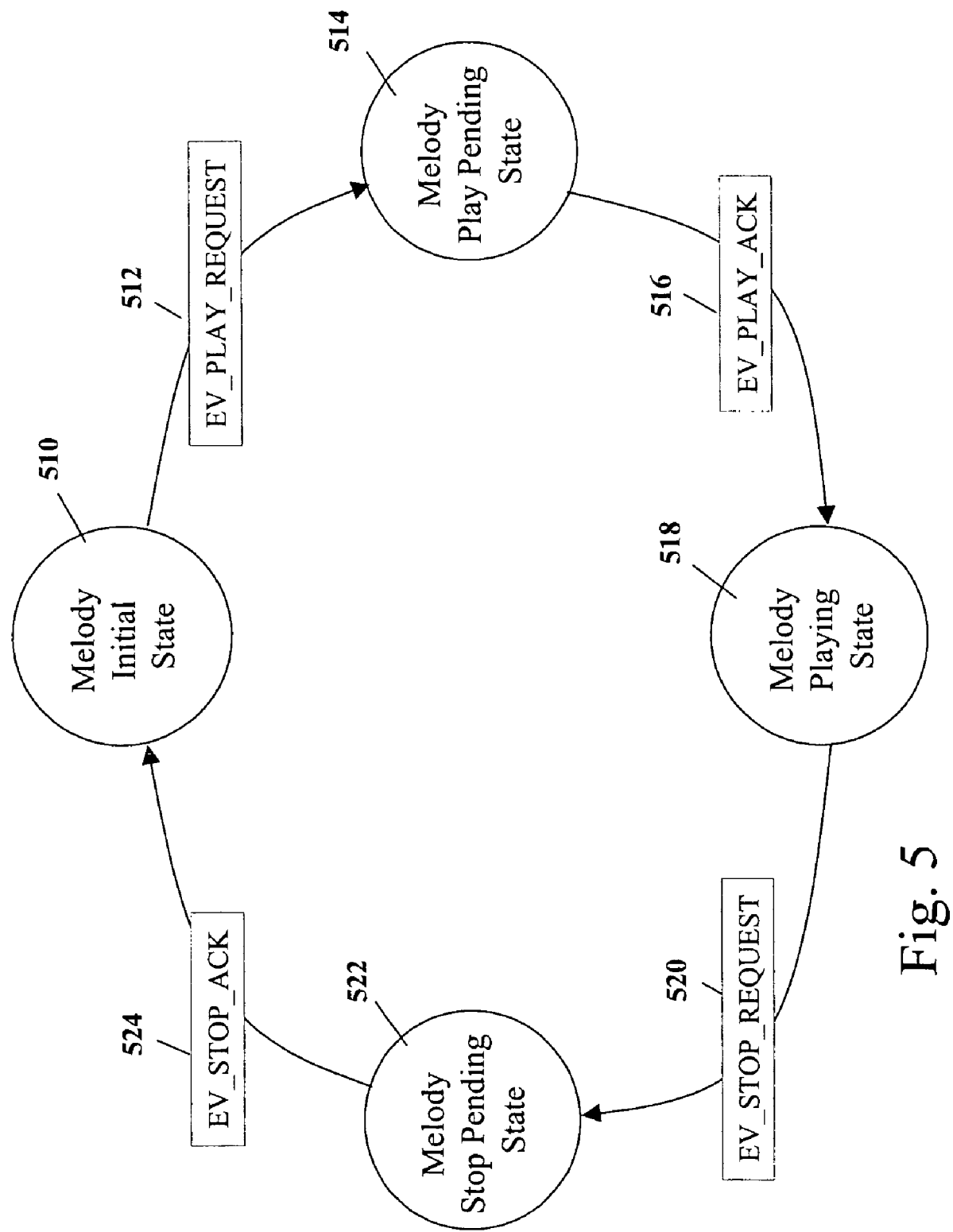
FIG. 5 is a state diagram showing various states according to the present method.

Reference is now made to FIG. 5. FIG. 5 shows a state diagram for various states for the Melody chip. The Melody chip originally starts in Melody initial state 510. If an event play request is made from a controlling application processor, the melody chip sends an event play request (EV_PLAY_REQUEST) 512. The Melody chip proceeds into a Melody Play Pending state 514.

Until acknowledgement of the play request is received back at the Melody Chip, the Melody chip will stay in the play pending state. Once the event play acknowledgement 516 is received, the chip next proceeds into a Melody Playing State 518.

In Melody playing state 518, the audio input to the HIAC 50 comes from Melody chip 12 as best seen in FIG. 2. Once the Melody chip completes playing of the file being played, an event stop request 520 is sent. The event stop request causes the Melody chip to proceed into a Stop Pending State 522 until an Event Stop Acknowledgement 524 is received.

Once the Event. Stop Acknowledgement is received, the Melody chip proceeds back into a Melody Initial State 510 and waits for the next play request.

As will be appreciated by those skilled in the art, the event stop request 520 can also be generated when competing audio sources require that an audio source pre-empt the current Melody playing state.

The above describes an Audio state machine. As will be appreciated, the above may be affected by the Radio finite state machine.

The above described embodiments of the present application are meant to be illustrative of preferred embodiments and are not intended to limit the scope of the present application. Various modifications, which would be readily apparent to one skilled in the art, are intended to be within the scope of the present application. The only limitations to the scope of the present application are set forth in the claims appended hereto.

We claim:

1. A method of audio control for a dual processor mobile device having a radio processor and an application processor, the radio processor in communication with a highly integrated audio codec, the dual processor mobile device further comprising a polyphonic audio chip in communication with both the application processor and the highly integrated audio codec, the method comprising:
    a) controlling the highly integrated audio codec from one of the application processor and the radio processor; and
    b) synchronizing the application processor and the radio processor by having the application processor control the highly integrated audio codec through the radio processor, wherein the synchronizing sends all control commands from the application processor through the radio processor and wherein the radio processor receives the control commands and generates an appropriate command to control the highly integrated audio codec.

2. The method of claim 1 wherein the control commands comprises a command specifying an audio input source at the highly integrated audio codec.

3. The method of claim 2, wherein the sending commands comprises a command to tell the highly integrated audio codec to start playing.

4. The method of claim 3, wherein the sending commands comprises specifying an audio output destination to the highly integrated audio codec.

5. The method of claim 4, wherein the sending commands comprises specifying the output volume to the highly integrated audio codec.

6. The method of claim 4, wherein the sending commands comprises first sending the command specifying the audio output destination before sending commands specifying the audio input source and to start playing.

7. The method of claim 4, wherein the audio output destination is selected from the group consisting of a speaker, a handset, a headset and a Bluetooth™ output.

8. The method of claim 1, wherein the control commands comprises modem commands.

9. A mobile device having improved audio management, the mobile device comprising:
    a radio subsystem configured to communicate with a network;
    a radio processor having a digital signal processor and configured to interact with said radio subsystem:
    an application processor configured to run user applications, the application processor further configured to interact with memory, a display and keyboard;
    a highly integrated audio codec configured to interact with audio output means and further adapted to interact with said radio processor;
    a polyphonic audio chip communicating with said application processor and said highly integrated audio codec; and
    communication means between the application processor and radio processor, said communication means configured to allow said application processor to control said highly integrated audio codec through said radio processor,
wherein the communication means is configured to forward all control commands from the application processor through the radio processor, where the radio processor is configured to receive the control commands and generate an appropriate command to the highly integrated audio codec.

10. The mobile device of claim 9, wherein said audio output means is selected from the group consisting of a speaker, a handset, a headset and a Bluetooth™ output.

11. The mobile device of claim 9, wherein the application processor is configured to send a command over the communication means to said radio processor to specify an audio input source at the highly integrated audio codec.

12. The mobile device of claim 11, wherein the application processor is configured to send a command over said communication means to said radio processor to tell the highly integrated audio codec to start playing.

13. The mobile device of claim 12, wherein the application processor is configured to send a command over said communication means to said radio processor to specify an audio output destination for the highly integrated audio codec.

14. The mobile device of claim 13, wherein the application processor is configured to send a command over said communication means to said radio processor to specifying the output volume for the highly integrated audio codec.

15. The mobile device of claim 14, wherein the application processor is configured to first send the command specifying the audio output destination before sending commands specifying the audio input source and to start playing.

16. The mobile device of claim 9, wherein the communication means is a modem communication means.

* * * * *